United States Patent
Kang et al.

(10) Patent No.: US 12,524,019 B2
(45) Date of Patent: Jan. 13, 2026

(54) CLOUD SERVER CAPABLE OF COMMUNICATING WITH AMR, AND CONTROL METHOD OF SAME

(71) Applicant: LG ELECTRONICS INC., Seoul (KR)

(72) Inventors: Sungkyu Kang, Seoul (KR); Sewan Gu, Seoul (KR); Seungmin Baek, Seoul (KR); Hyunseok Yang, Seoul (KR); Youngjae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 284 days.

(21) Appl. No.: 18/549,816

(22) PCT Filed: Apr. 12, 2021

(86) PCT No.: PCT/KR2021/004540
§ 371 (c)(1),
(2) Date: Feb. 16, 2024

(87) PCT Pub. No.: WO2022/203110
PCT Pub. Date: Sep. 29, 2022

(65) Prior Publication Data
US 2024/0219918 A1 Jul. 4, 2024

(30) Foreign Application Priority Data

Mar. 24, 2021 (KR) .................. 10-2021-0038131

(51) Int. Cl.
*G05D 1/244* (2024.01)
*G06F 16/953* (2019.01)
(Continued)

(52) U.S. Cl.
CPC .......... *G05D 1/244* (2024.01); *G06F 16/953* (2019.01); *G05D 2105/20* (2024.01);
(Continued)

(58) Field of Classification Search
CPC ............... G05D 1/244; G05D 2107/40; G05D 2111/32; G05D 2105/20; G05D 2107/10; G06F 16/953
See application file for complete search history.

(56) References Cited

U.S. PATENT DOCUMENTS 9,723,656 B2 * 8/2017 Worley, III ............ A63H 27/12
9,828,092 B1 * 11/2017 Navot .................... B64U 10/14
(Continued)

FOREIGN PATENT DOCUMENTS

| KR | 1020100059214 | 6/2010 |
|---|---|---|
| KR | 1020120063378 | 6/2012 |

(Continued)

OTHER PUBLICATIONS

PCT International Application No. PCT/KR2021/004540, International Search Report dated Dec. 14, 2021, 14 pages.

*Primary Examiner* — Ramsey Refai
(74) *Attorney, Agent, or Firm* — LEE, HONG, DEGERMAN, KANG & WAIMEY (57) ABSTRACT

The present invention relates to a control method of a cloud server capable of communicating with an autonomous mobile robot (AMR), wherein the control method comprises the steps of: receiving, from a mobile phone or a delivery service-related server, address information, delivery product information, and at least one of a drop location-related image or a capture image; generating a first landmark on the basis of the received address information; and generating a second landmark on the basis of the received delivery product information.

10 Claims, 5 Drawing Sheets

(51) Int. Cl.
*G05D 105/20* (2024.01)
*G05D 107/10* (2024.01)
*G05D 107/40* (2024.01)
*G05D 111/30* (2024.01)

(52) U.S. Cl.
CPC ..... *G05D 2107/10* (2024.01); *G05D 2107/40* (2024.01); *G05D 2111/32* (2024.01)

(56) References Cited

U.S. PATENT DOCUMENTS

| | | | | |
|---|---|---|---|---|
| 9,840,340 | B2* | 12/2017 | O'Toole | A47G 29/122 |
| 9,928,749 | B2* | 3/2018 | Gil | B60P 3/11 |
| 10,403,155 | B2* | 9/2019 | Kimchi | G05D 1/00 |
| 10,457,421 | B2* | 10/2019 | O'Toole | B60L 53/80 |
| 11,574,512 | B2* | 2/2023 | Morris | G07C 9/00309 |
| 11,691,760 | B2* | 7/2023 | Walsh | A47G 29/141 |
| | | | | 701/3 |
| 12,205,483 | B1* | 1/2025 | Cao | G08G 5/57 |
| 2014/0365258 | A1* | 12/2014 | Vestal | G06Q 10/063114 |
| | | | | 901/1 |
| 2016/0165661 | A1 | 6/2016 | Worley, III et al. | |
| 2018/0107211 | A1* | 4/2018 | Schubert | G08G 5/21 |
| 2021/0132625 | A1* | 5/2021 | Gillett | G05D 1/0088 |

FOREIGN PATENT DOCUMENTS

| | | |
|---|---|---|
| KR | 1020150045724 | 4/2015 |
| KR | 102181423 | 11/2020 |

* cited by examiner

[Mode A]

FIG. 3

[Mode B]

FIG. 4

[Mode C]

CLOUD SERVER CAPABLE OF COMMUNICATING WITH AMR, AND CONTROL METHOD OF SAME

CROSS-REFERENCE TO RELATED APPLICATION(S)

This application is the National Stage filing under 35 U.S.C. 371 of International Application No. PCT/KR2021/004540, filed on Apr. 12, 2021, which claims the benefit of earlier filing date and right of priority to Korean Application No. 10-2021-0038131, filed on Mar. 24, 2021, the contents of which are all incorporated by reference herein in their entirety.

TECHNICAL FIELD

The present disclosure relates to an AMR robot and a cloud server. More specifically, the AMR autonomous mobile robot may operate indoors and outdoors in an integrated manner using a plurality of landmarks for different purposes, and may use only essential data resources and communication resources in such process.

BACKGROUND

Because of the corona virus or the like, a delivery-related industry market is growing, and in particular, many delivery-related companies are independently developing an autonomous mobile robot.

However, according to the prior art, the autonomous mobile robot has been developed only indoors or researches have been conducted focusing on a robot that is mobile only outdoors.

However, there is a problem in that developing the robots for indoor and outdoor separately requires enormous costs, and especially for heavy objects, it is better to design the autonomous mobile robot to enter indoors and perform final unloading to meet needs of a user.

SUMMARY

Technical Problem

One embodiment of the present disclosure is to define a process of automatically setting and updating a plurality of landmarks to adaptively apply indoor and outdoor movement algorithms in a process of an AMR robot delivering a specific product to a specific person.

Furthermore, another embodiment of the present disclosure is to provide a technology for accurately predicting a time point at which an indoor movement algorithm should be applied from an outdoor movement algorithm after confirming a first landmark.

In addition, another embodiment of the present disclosure is to provide a process for determining whether a second landmark needs to be additionally set after determining a type and attribute information of a delivery product.

Technical Solutions

A method for controlling a cloud server capable of being in communication with an autonomous mobile robot (AMR) robot according to one embodiment of the present disclosure includes receiving at least one of address information, delivery product information, a drop location-related image, or a captured image from a mobile phone or a delivery service-related server, generating a first landmark based on the received address information, wherein the first landmark is used to determine timings for applying algorithms to be used in indoor movement and outdoor movement, and generating a second landmark based on the received delivery product information. The second landmark corresponds to one of the drop location-related image and the captured image.

In one implementation, the method may further include determining whether a first landmark image registered in a database exists based on the received address information, and querying a web server for the address information and a specific keyword together when the first landmark image does not exist.

In one implementation, the method may further include analyzing the first landmark image received from the AMR robot, analyzing, only when at least one other object is detected on the initially registered first landmark image, attribute information of the corresponding object, and determining whether to update the first landmark image based on the attribute information.

In one implementation, the method may further include transmitting the confirmed first landmark to the AMR robot, calculating an estimated time of arrival based on a current location and a speed of the AMR robot and a location of the first landmark, calculating a delay time based on attribute information of the first landmark itself and surrounding situation information, adjusting the estimated time of arrival based on the calculated delay time, and transmitting an algorithm change command to the AMR robot based on the adjusted time.

In one implementation, the method may further include determining whether the drop location-related image exists after the adjusted time, determining whether an attribute of the delivery product information includes private information when the drop location-related image exists, and transmitting a command for triggering a specific algorithm to ignore the drop location-related image and detect the captured image to the AMR robot only when the attribute includes the private information.

Advantageous Effects

According to one embodiment of the present disclosure, in the process of the AMR robot delivering the specific product to the specific person, the process of automatically setting and updating the plurality of landmarks to adaptively apply the indoor and outdoor movement algorithms is defined, thereby minimizing an unnecessary use of algorithms.

Furthermore, according to another embodiment of the present disclosure, the technology for accurately predicting the time point at which the indoor movement algorithm should be applied from the outdoor movement algorithm after confirming the first landmark is provided, thereby reducing the error and the possibility of error.

In addition, according to another embodiment of the present disclosure, the second landmark is additionally set after determining the type and the attribute information of the delivery product, thereby accurately delivering the specific product to the specific person.

However, in addition to the effects of the present disclosure mentioned above, technical effects that may be inferred by those skilled in the art based on the contents described throughout the present document also fall within the scope of the present disclosure.

BRIEF DESCRIPTION OF THE DRAWINGS

In addition.

DETAILED DESCRIPTION

Hereinafter, the embodiments disclosed herein will be described in detail with reference to the accompanying drawings, but components that are the same as or similar to each other regardless of reference numerals will be given the same reference numerals, and redundant description thereof will be omitted. The suffixes "module" and "unit" for components used in the following description are given or used together in consideration of ease of writing the present document, and do not have meanings or roles that are distinct from each other by themselves. Further, in describing the embodiments disclosed herein, when it is determined that a detailed description of related known technologies may unnecessarily obscure the gist of the embodiments disclosed herein, detailed description thereof will be omitted. In addition, the attached drawings are provided for easy understanding of the embodiments disclosed herein and do not limit technical idea disclosed herein, and should be construed as including all modifications, equivalents, and alternatives falling within the spirit and scope of the present disclosure.

Although terms including ordinal numbers, such as first, second, and the like, may be used to describe various components, the components are not be limited by the terms. The terms are only used to distinguish one component from another.

It should be understood that when a component is referred to as being "connected with" another component, the component may be directly connected with another component or an intervening component may also be present. In contrast, it should be understood that when a component is referred to as being "directly connected with" another component, there is no intervening component present.

A singular representation may include a plural representation unless it represents a definitely different meaning from the context.

Terms such as "includes" or "has" used herein are intended to specify that there are figures, numbers, steps, operations, constituents, components, or combinations thereof, and should be understood as not precluding possibility of existence or addition of one or more other figures, numbers, steps, operations, constituents, components, or combinations thereof.

Figure 1:
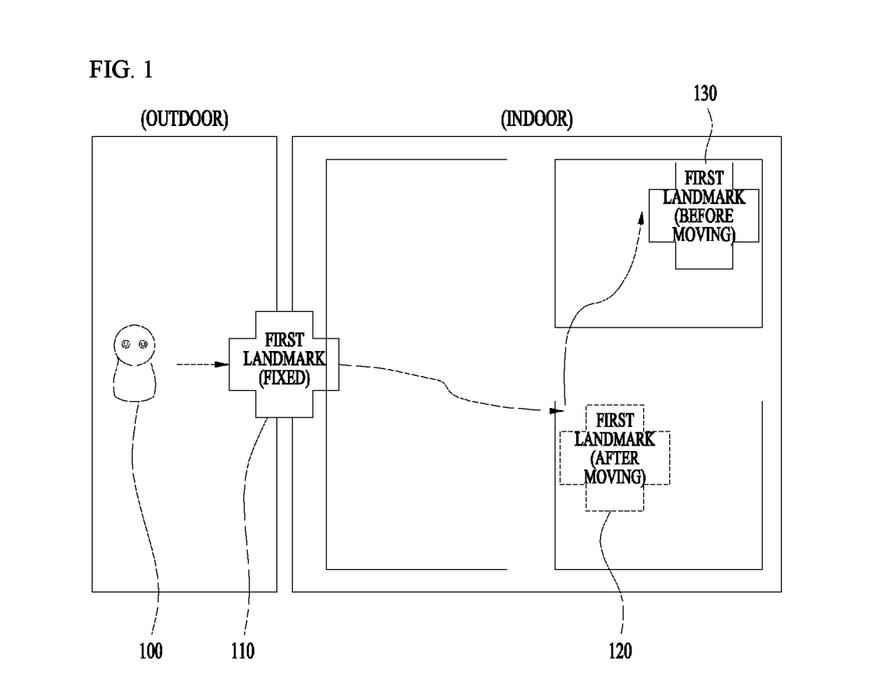
FIG. 1 shows two landmarks required in a process in which an AMR robot moves according to an embodiment of the present disclosure.

FIG. 1 shows two landmarks required in a process in which an AMR robot moves according to an embodiment of the present disclosure.

As shown in FIG. 1, in a process in which an AMR robot 100 performs indoor and outdoor integrated autonomous movement (e.g., a situation in which a specific product must be delivered to a specific place and a specific person), it is to control only minimum algorithms to be executed in a memory.

For example, when the AMR robot 100 according to one embodiment of the present disclosure senses a first landmark 110 that distinguishes indoors and outdoors, a movement algorithm and related sensors are automatically turned on/off. A more specific process of initially setting/updating a first landmark image for distinguishing between the indoors and the outdoors will be described later in detail with reference to FIG. 6.

Furthermore, it is important for the AMR robot 100 according to one embodiment of the present disclosure to accurately determine a specific time point for switching an indoor movement algorithm to an outdoor movement algorithm after recognizing (confirming) the first landmark. An embodiment related to the same will be described later in detail in FIG. 7.

In addition, after the AMR robot 100 according to one embodiment of the present disclosure enters indoors, it is necessary to determine priorities of second landmarks 120 and 130, which are set to change in association with a type of delivery product. Embodiments related to the same will be described later in detail in FIG. 8.

Figure 2:
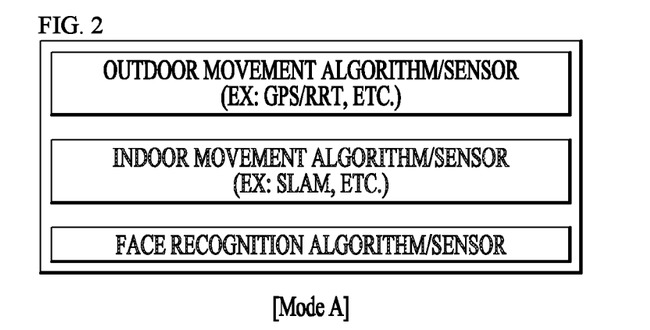
FIGS. 2, 3, and 4 show three modes supported based on attribute information and the like of a delivery product delivered by an AMR robot.
Figure 3:
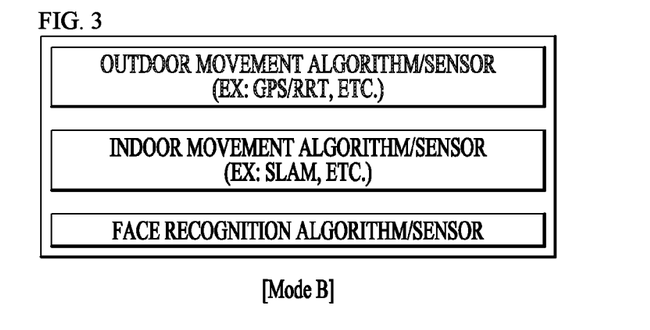
Figure 4:
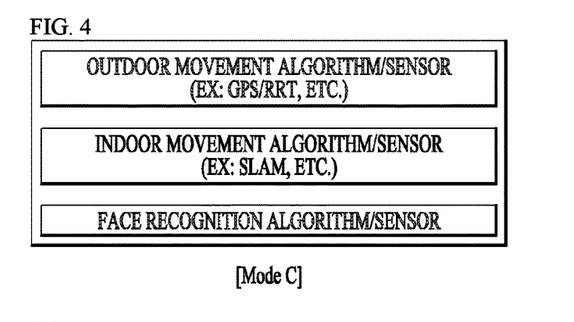

FIGS. 2, 3, and 4 show three modes supported based on attribute information and the like of a delivery product delivered by an AMR robot.

When the AMR robot 100 shown in FIG. 1 is located outdoors, the AMR robot is designed to activate only the algorithm for the outdoor movement and a sensor necessary for the outdoor movement, as shown in FIG. 2, without enabling all algorithms and sensors. This may be referred to as a mode A in the present disclosure.

On the other hand, when the AMR robot 100 shown in FIG. 1 enters indoors, the AMR robot turns off the algorithm for the outdoor movement and the sensors necessary for the outdoor movement shown in FIG. 2. However, when the AMR robot enters indoors, the AMR robot is designed to operate in two different modes, unlike outdoors.

For example, the AMR robot is designed to operate in a mode B shown in FIG. 3 or a mode C shown in FIG. 4 based on the attribute information of the product to be delivered.

More specifically, for example, when the product to be delivered by the AMR robot is a product that must be delivered to a specific person, such as a registered mail, it is designed to activate the algorithm for the indoor movement and sensors necessary for the indoor movement as shown in the mode B shown in FIG. 3, and at the same time, additionally activate an algorithm and a sensor related to face recognition.

On the other hand, when the product to be delivered by the AMR robot is not the product that must be delivered to the specific person, such as the registered mail, only the algorithm for the indoor movement and the sensors necessary for the indoor movement are activated, as in the mode C shown in FIG. 4, and the algorithm and the sensor related to the face recognition remain off.

As shown in FIGS. 2 to 4, the AMR robot according to one embodiment of the present disclosure has a technical effect of using and maintaining the memory of the AMR robot more compactly by minimizing a use of unnecessary algorithms. In the prior art, because there was no algorithm/sensor distinction for each mode, there was often a problem with memory overload.

Figure 5:
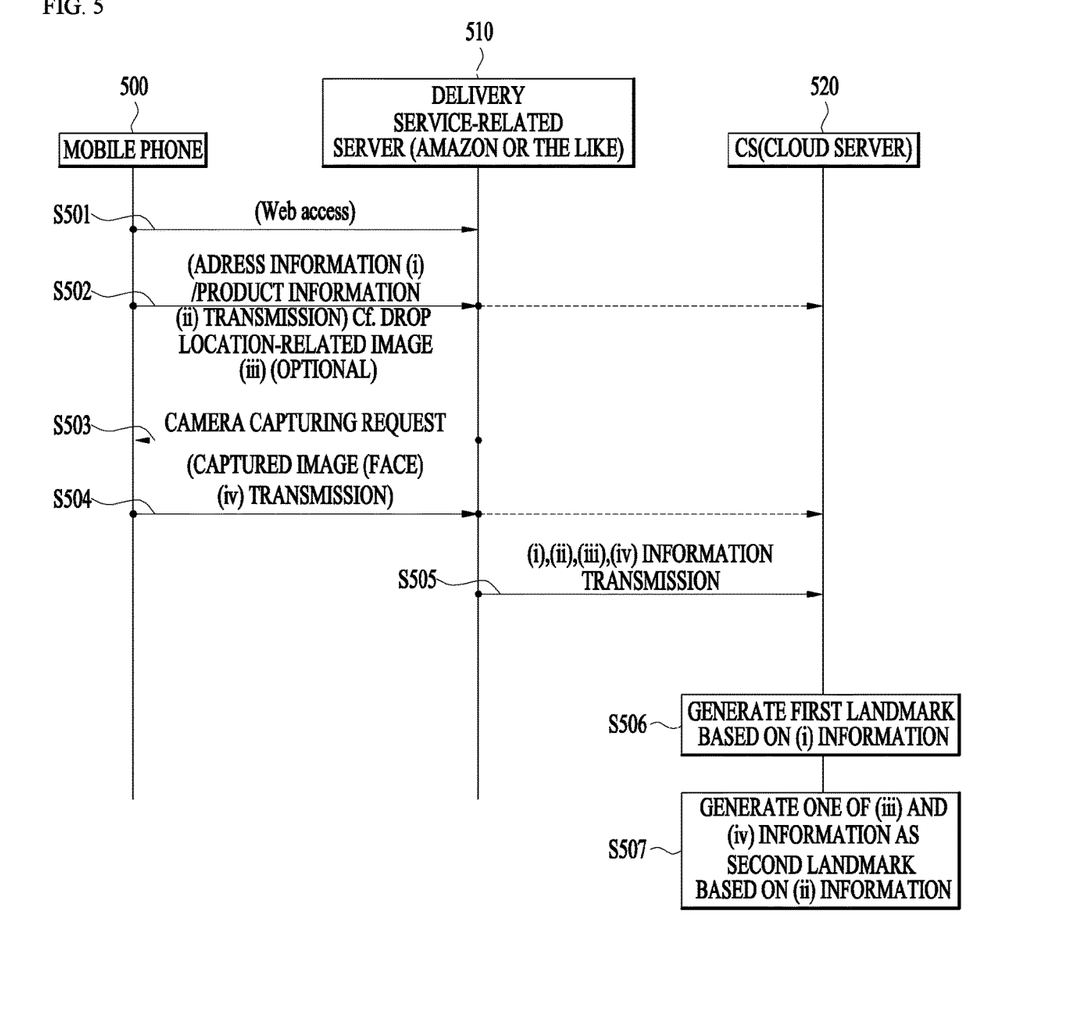
FIG. 5 shows entire processes of indoor/outdoor integrated autonomous movement based on a first landmark and a second landmark.

FIG. 5 shows entire processes of indoor/outdoor integrated autonomous movement based on a first landmark and a second landmark.

A user using a mobile phone 500 accesses a delivery service-related server 510 via a URL web page, an application, or the like (S501).

The mobile phone 500 transmits destination address information, product information, and the like of the product to be delivered to the delivery service-related server 510 (S502). When the user wants the product to be delivered to be unloaded at a specific location inside the house, a drop location-related image is transmitted together.

Furthermore, when determining that the product to be delivered has private attribute information (e.g., the registered mail), the delivery service-related server requests the mobile phone 500 to photograph a user's face (S503).

In response thereto, the mobile phone 500 is designed to transmit the image of the face of the user who needs to receive the specific product to the delivery service-related server 510 (S504).

A cloud server 520 receives at least one of the address information, the delivery product information, and the drop location-related image, or the captured image from the delivery service-related server 510 (S505). However, directly receiving, by the cloud server 520, the aforementioned information from the mobile phone 500 without via the delivery service-related server 510 also falls within the scope of the present disclosure.

The cloud server 520 creates the first landmark based on the received address information (S506). The first landmark is used, for example, to determine timings at which the algorithms to be used in the indoor movement and the outdoor movement are applied. This will be described later in detail with reference to FIG. 6.

Furthermore, the cloud server 520 generates one of the drop location-related image and the captured image as the second landmark based on the received delivery product information (S507). This will be described later in detail with reference to FIG. 8.

Figure 6:
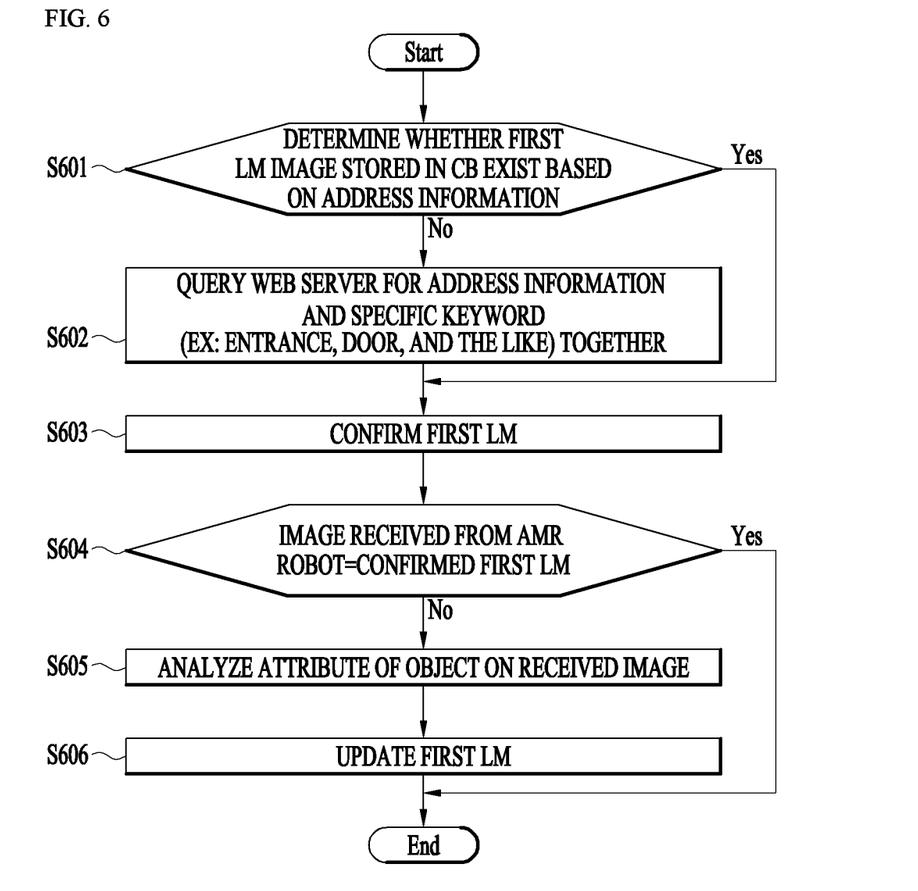
FIG. 6 shows processes for determining whether to update based on first landmark determination and obstacle attribute information.

FIG. 6 shows processes for determining whether to update based on first landmark determination and obstacle attribute information.

Based on the address information received in S502 in FIG. 5, the cloud server determines whether the first landmark image registered in a database exists (S601). The first landmark may be, for example, a door that distinguishes between the indoors and the outdoors or the like.

When there is no image related to the first landmark in the database, the cloud server is designed to query a web server for the address information and a specific keyword (e.g., an entrance, the door, and the like) together (S602). In response to the query, the web server returns an image related to the door for entering a building at the corresponding address to the cloud server. The cloud server confirms the first landmark received from the web server (S603).

The cloud server analyzes an image received from the AMR robot and the image of the first landmark confirmed in S603 (S604).

When the image received from the AMR robot and the confirmed first landmark are not the same (or have an error exceeding a preset error range), the cloud server analyzes attribute information of an object on the received image (S605).

Depending on whether the attribute information is a temporary obstacle or a permanent obstacle, whether to update the first landmark is determined (S606). More specifically, for example, when the object overlapping the first landmark is located at the same distance as the first landmark (e.g., a color change) as a result of capturing with a 3D depth camera of the AMR robot, the object is likely to be the permanent obstacle. Therefore, at this time, the cloud server updates the first landmark.

On the other hand, when the object overlapping the first landmark is not located at the same distance as the first landmark (e.g., when luggage is located in front of the door) as a result of capturing with the 3D depth camera of the AMR robot, it is more likely that the object is not the permanent obstacle. Therefore, at this time, the cloud server is designed not to update the first landmark.

Figure 7:
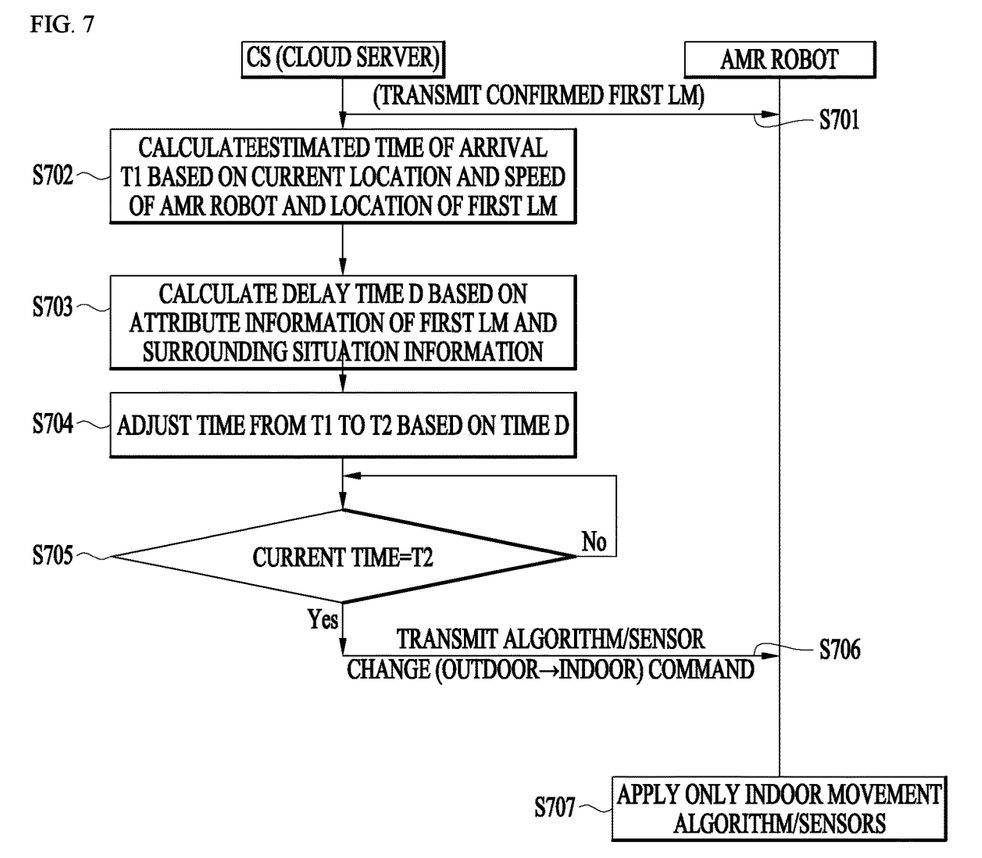
FIG. 7 shows processes for adaptively changing a timing of application of a movement algorithm.

FIG. 7 shows processes for adaptively changing a timing of application of a movement algorithm. An advantage of the embodiment shown in FIG. 7 is that an error probability is drastically reduced by more accurately defining a timing of application of a specific algorithm after the landmark detection.

In the above embodiments, the first landmark detection/update technology for determining whether the AMR robot enters indoors from outdoors was mainly discussed.

However, even when the AMR robot recognizes the first landmark, changing the movement algorithm immediately is likely to cause another problem. This is because a point where the AMR robot recognizes the first landmark is still outdoors, and an error in how long it will take to enter indoors may vary greatly depending on a surrounding situation.

Another technology is required to accurately predict a timing of entering indoors from outdoors after the AMR robot recognizes the first landmark, and a solution therefor will be described with reference to FIG. 7.

As shown in FIG. 7, the cloud server transmits the first landmark confirmed in FIG. 6 to the AMR robot (S701). Here, more specifically, the confirmed first landmark may be, for example, the image pre-registered in the cloud server or the new image acquired via the query/response with the web server.

Furthermore, the cloud server calculates an estimated time of arrival T1 based on a current location and a speed of the AMR robot and a location of the first landmark via communication with the AMR robot (S702). Here, the estimated time of arrival T1 means a time point at which the AMR robot passes the first landmark.

In addition, the cloud server calculates a delay time D based on attribute information of the first landmark itself and surrounding situation information (S703).

Here, the attribute information of the landmark itself varies, for example, depending on whether it is an open door that is always open, an automatic door that takes a certain amount of time, or a door that may be entered after checking a right of entry by a person (a guard or the like). This may be determined by the AMR robot itself or via the communication with the cloud server, and both of which belong to the scope of the present disclosure.

Furthermore, in terms of the surrounding situation, it is designed that, for example, the delay time D is proportional to the number of people around the landmark.

Accordingly, the cloud server adjusts the estimated time of arrival from T1 to T2 based on the calculated delay time D (S704).

In addition, only when a current time corresponds to T2, the cloud server transmits an algorithm and sensor change command to the AMR robot (S706), and the AMR robot activates only the indoor movement algorithm and sensors (S707). That is, the AMR robot operates in the mode B shown in FIG. 3 or the mode C shown in FIG. 4. However, whether to select the mode B or the mode C varies depending on the type of the product to be delivered, which will be described below with reference to FIG. 8.

Figure 8:
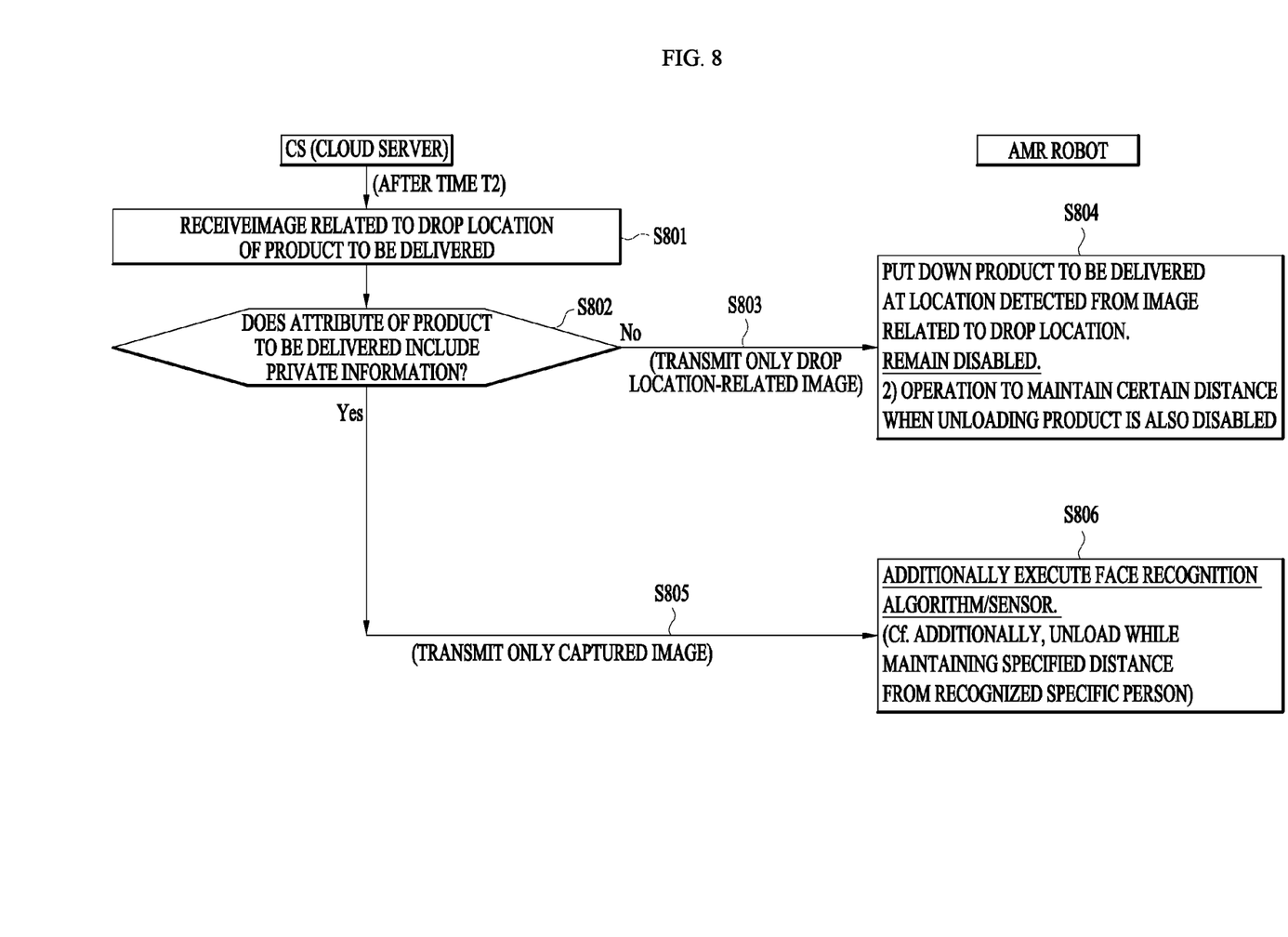
FIG. 8 shows processes for determining priorities of second landmarks after an AMR robot enters indoors.

FIG. 8 shows processes for determining priorities of second landmarks after an AMR robot enters indoors. FIG. 8 is an embodiment applied after the AMR robot 100 shown in FIG. 1 enters indoors.

The cloud server according to one embodiment of the present disclosure receives the image related to the drop location where the product to be delivered is finally placed after the time T2 adjusted in FIG. 7 (S801). This has been described above in FIG. 5.

However, unlike the prior art, the cloud server according to one embodiment of the present disclosure determines whether the attribute of the product to be delivered includes private information (S802). Here, the private information refers to, for example, a specific object specified by the user, the registered mail, a card, and the like, which must be directly transmitted only to a specific person.

When the attribute of the product to be delivered does not include the private information as a result of the determination (S802), the cloud server transmits only the drop location-related image to the AMR robot (S803).

In this regard, the AMR robot according to one embodiment of the present disclosure drops the product at the location indoors detected from the drop location-related image, and does not activate the face recognition algorithm/sensor (S804).

On the other hand, when the attribute of the product to be delivered includes the private information as a result of the determination (S802), the cloud server is designed to transmit only the image of the user's face to the AMR robot instead of the drop location-related image (S805).

In this regard, the AMR robot according to one embodiment of the present disclosure activates the face recognition algorithm/sensor indoors and places the corresponding product at a certain distance from the recognized user's face (S806).

The present disclosure described above may be implemented with computer-readable codes on a medium in which a program is recorded. Computer-readable media include all kinds of recording devices in which data readable by a computer system is stored. Examples of computer-readable media include a hard disk drive (HDD), a solid state disk (SSD), a silicon disk drive (SDD), a ROM, a RAM, a CD-ROM, a magnetic tape, a floppy disk, an optical data storage device, and the like, and also includes those implemented in a form of a carrier wave (e.g., transmission over the Internet). In addition, the computer may include a controller 180 of a terminal. Accordingly, the above detailed description should not be construed as limiting in all respects and should be considered illustrative. The scope of the present disclosure should be determined by reasonable interpretation of the appended claims, and all changes within the equivalent scope of the present disclosure are included in the scope of the present disclosure.

Embodiment

In the detailed description above, the various embodiments have been described.

INDUSTRIAL APPLICABILITY

Because the present disclosure may be applied to robots in various fields, industrial applicability is acknowledged.

What is claimed is:

1. A method for controlling a cloud server capable of being in communication with an autonomous mobile robot (AMR) robot, the method comprising:
   receiving at least one of address information, delivery product information, a drop location-related image, or a captured image from a mobile phone or a delivery service-related server;
   generating a first landmark based on the received address information, wherein the first landmark is used to determine timings for applying algorithms to be used in indoor movement and outdoor movement; and
   generating a second landmark based on the received delivery product information,
   wherein the second landmark corresponds to one of the drop location-related image and the captured image.

2. The method of claim 1, further comprising:
   determining whether a first landmark image registered in a database exists based on the received address information; and
   querying a web server for the address information and a specific keyword together when the first landmark image does not exist.

3. The method of claim 2, further comprising:
   analyzing the first landmark image received from the AMR robot;
   analyzing, only when at least one other object is detected on the initially registered first landmark image, attribute information of the corresponding object; and
   determining whether to update the first landmark image based on the attribute information.

4. The method of claim 3, further comprising:
   transmitting the confirmed first landmark to the AMR robot;
   calculating an estimated time of arrival based on a current location and a speed of the AMR robot and a location of the first landmark;
   calculating a delay time based on attribute information of the first landmark itself and surrounding situation information;
   adjusting the estimated time of arrival based on the calculated delay time; and
   transmitting an algorithm change command to the AMR robot based on the adjusted time.

5. The method of claim 4, further comprising:
   determining whether the drop location-related image exists after the adjusted time;
   determining whether an attribute of the delivery product information includes private information when the drop location-related image exists; and
   transmitting a command for triggering a specific algorithm to ignore the drop location-related image and detect the captured image to the AMR robot only when the attribute includes the private information.

6. A cloud server capable of being in communication with an autonomous mobile robot (AMR) robot, the cloud server comprising:
   a communication module configured to receive at least one of address information, delivery product information, a drop location-related image, or a captured image from a mobile phone or a delivery service-related server; and
   a controller configured to generate a first landmark based on the received address information and generate a second landmark based on the received delivery product information,
   wherein the first landmark is used to determine timings for applying algorithms to be used in indoor movement and outdoor movement, and the second landmark corresponds to one of the drop location-related image and the captured image.

7. The cloud server of claim 6, wherein the controller is configured to:
   determine whether a first landmark image registered in a database exists based on the received address information; and
   query a web server for the address information and a specific keyword together when the first landmark image does not exist.

8. The cloud server of claim 7, wherein the controller is configured to:
   analyze the first landmark image received from the AMR robot;
   analyze, only when at least one other object is detected on the initially registered first landmark image, attribute information of the corresponding object; and
   determine whether to update the first landmark image based on the attribute information.

9. The cloud server of claim 8, wherein the controller is configured to:
   transmit the confirmed first landmark to the AMR robot;
   calculate an estimated time of arrival based on a current location and a speed of the AMR robot and a location of the first landmark;
   calculate a delay time based on attribute information of the first landmark itself and surrounding situation information;
   adjust the estimated time of arrival based on the calculated delay time; and
   transmit an algorithm change command to the AMR robot based on the adjusted time.

10. The cloud server of claim 9, wherein the controller is configured to:
   determine whether the drop location-related image exists after the adjusted time;
   determine whether an attribute of the delivery product information includes private information when the drop location-related image exists; and
   transmit a command for triggering a specific algorithm to ignore the drop location-related image and detect the captured image to the AMR robot only when the attribute includes the private information.

* * * * *